United States Patent

[11] 3,633,924

[72] Inventors Robert L. Cowell; Richard L. May, both of Manhattan Beach; Thomas E. See, Huntington Beach; Edwin O. Stastny, Santa Ana, all of Calif.

[21] Appl. No. 846,430
[22] Filed July 31, 1969
[45] Patented Jan. 11, 1972
[73] Assignee Mattel, Inc. Hawthorne, Calif.

[54] MINIATURE PHONOGRAPH
5 Claims, 4 Drawing Figs.

[52] U.S. Cl. .......... 274/9 C, 274/1 G
[51] Int. Cl. .......... G11b 3/40, G11b 25/04
[50] Field of Search .......... 274/1.7, 7, 9

[56] References Cited

UNITED STATES PATENTS

| | | | |
|---|---|---|---|
| 3,181,870 | 5/1965 | Lasswell | 274/9 |
| 3,224,782 | 12/1965 | Isemura | 274/9 |
| 3,239,229 | 3/1966 | Freeman et al. | 274/1.1 |
| 3,484,111 | 12/1969 | Starr | 274/9 |
| 3,389,636 | 6/1968 | Weitzner et al. | 353/19 |

*Primary Examiner*—Leonard Forman
*Assistant Examiner*—Steven L. Stephan
*Attorney*—Seymour A. Scholnick

ABSTRACT: A phonograph which lies on a stationary disc-type record, including a tone arm which rotates around the record while a stylus thereon moves along the record groove to play back the recording. The phonograph has a cylindrical housing, and the tone arm has the same curvature as the housing, for reception flush therewith for storage. A case for holding the phonograph can be placed on top of the phonograph to serve as an acoustical amplifier.

INVENTORS
ROBERT L. COWELL
RICHARD L. MAY
THOMAS E. SEE
EDWIN O. STASTNY

BY Max E. Shirk
ATTORNEYS

MINIATURE PHONOGRAPH

BACKGROUND OF THE INVENTION

1. Field of the Invention

This invention relates to phonographs.

2. Description of the Prior Art

Most phonographs include a turntable for rotating a disc-shaped record and a tone arm which is substantially stationary, the tone arm moving only radially toward the center of the record to follow along a spiral record groove. Such phonographs are almost inherently bulky, inasmuch as the phonograph housing must include a portion extending from the turntable past the perimeter of the record to provide a pivotal support for the tone arm. One approach to phonograph construction which is inherently more compact, is the use of a tone arm which rotates around the center of the record, while the record remains stationary. However, in order to provide a significant advantage over existing phonographs in playing the common disc-type records, the phonograph must be of minimum size and of a shape which allows it to be easily stored and carried. Furthermore, the compactness must not result in a substantial decrease in tone quality.

OBJECTS AND SUMMARY OF THE INVENTION

An object of the present invention is to provide a phonograph which can be compacted to a small and easily stored shape when not in use.

Another object is to provide a phonograph and case system which allows good sound reproduction in a small package.

In accordance with the present invention, a phonograph is provided which can assume a highly compact and easily carried configuration. The phonograph includes a housing with a round perimeter that can lie on the center of a record, and a tone arm which rotates around the housing to play the stationary record. The tone arm is mounted so that it can be moved to a storage position wherein it is within the perimeter of the round phonograph housing, to provide easier storage and carrying.

A carrying case provided for the phonograph can be mounted on top of the phonograph during its use to enhance the tone quality, particularly to increase the base response. The phonograph has an upwardly facing speaker near its top and has openings near its bottom. The carrying case has one acoustically open end for mounting on top of the housing so that the inside of the case serves as an acoustical amplifying chamber.

The novel features of the invention are set forth with particularity in the appended claims. The invention will be best understood from the following description when read in conjunction with the accompanying drawings.

DESCRIPTION OF THE PREFERRED EMBODIMENTS

Figures 1, 2, 3, 4:
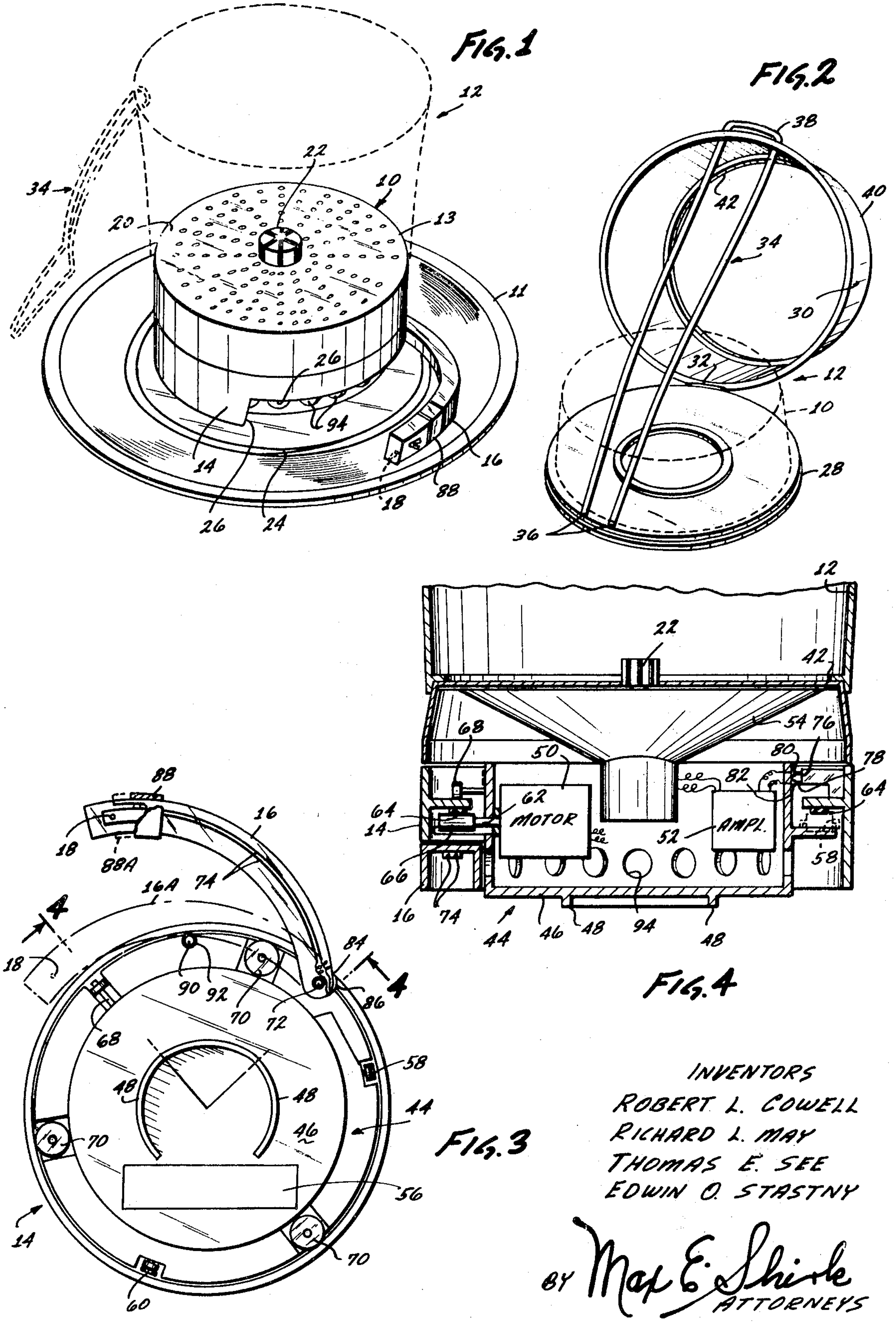
FIG. 1 is a perspective view of a phonograph constructed in accordance with the invention, showing it playing a record, and showing in phantom lines a sound-enhancing carrying case positioned on the phonograph.
FIG. 2 is a perspective view of the carrying case which was shown in phantom lines in FIG. 1.
FIG. 3 is a bottom view of the phonograph of FIG. 1.
FIG. 4 is a sectional view taken on the lines 4—4 of FIG. 3.

FIG. 1 illustrates a phonograph 10 constructed in accordance with the invention, showing its manner of playing a disc-type record 11, and also showing the manner in which a carrying case, shown in phantom lines at 12, can be mounted on the phonograph to enhance the sound therefrom. The phonograph is substantially cylindrical, with a stationary upper housing portion 13 and a rotatable member serving as a lower housing portion 14. A tone arm 16 is pivotally mounted on the rotatable housing portion 14 for rotation with it around the stationary upper portion 13. The tone arm 16 carries a stylus pickup means shown in phantom lines at 18, which engages a spiral groove formed in the record. A motor within the housing rotates the housing portion 14 so that the tone arm 16 continually rotates around the record and its stylus 18 follows the spiral record groove. The stylus is coupled by electric wires to an amplifier within the housing, whose output is delivered to a speaker near the top of the housing. The sound recording defined by the record groove is reproduced as sounds emanating through the top 20 of the upper housing.

The phonograph is used by placing it at the center of the record 11, pulling out the tone arm 16 until the stylus 18 is just within the edge of the record, and turning on a switch 22 to energize the motor that rotates the lower housing portion and tone arm thereon, and the amplifier within the housing. The stylus 18 follows the spiral record groove to reproduce the sounds defined therein, until it reaches a runout groove 24 at a center portion of the record. A runout groove is typically provided in records for receiving the stylus after the complete spiral groove has been played. As the tone arm approaches the runout groove 24, it operates a switch on the phonograph housing which deenergizes the motor and amplifier. The operator can move the tone arm 16 even further inwardly so that it is received within a tone arm receiving aperture 26 in the lower housing portion 14, the tone arm 16 then being substantially flush with the housing. In this configuration, the phonograph is very compact and can be easily stored and carried.

The carrying case 12, best shown in FIG. 2, has a base 28 on which the phonograph 10 can be laid, and a cover 30 pivotally mounted on the base at 32 which can be closed over the phonograph. A cord 34 serves both as a latch to keep the cover closed tightly on the base 28, and as a carrying handle. The cord 34 has ends 36 fixed to the base at a position opposite the hinge at 32, and has a portion 38 extending through apertures in the cover near the bottom thereof. When the phonograph is within the case, the cover 30 is closed thereon, and the cord portion 38 is pulled taut, the cord then serves as a handle to hold the case. The taut cord also keeps the cover 30 closed tightly on the base 28. If the case has been laid on a table and the cord 34 is released, the cover 30 may be easily pivoted open to remove the phonograph therefrom.

The case also serves as an acoustical chamber to enhance the sound emanating from the top of the phonograph housing. The upper end 40 or the case has an inwardly extending flange 42 which serves to keep the phonograph from falling out of the case when the case is upside down, and which also serves to enable mounting of the case on the phonograph in the manner shown in FIG. 1. The end 40 of the case is open over the entire area within the flange 42. Thus, this end is acoustically open, that is, sound waves from the top of the phonograph housing can readily pass through the end 40. If desired, a grill work sheet could be placed over the end 40 of the case to provide a substantially acoustically open end which has a more closed appearance. The opposite end of the case which contains the base 28 is solid. As a result, when the case is mounted on the phonograph as shown in FIG. 1, sound waves from the top of the phonograph pass into the case where they vibrate the walls of the case to provide a better coupling to the surrounding air. This considerably enhances the sound emanating from the phonograph, particularly the bass frequency components. Thus, the carrying case also serves as a sound enhancing means to provide good quality sound from a small phonograph, the phonograph and case taking up very little room when the phonograph is stored in the case.

FIGS. 3 and 4 show more of the details of the phonograph apparatus. The phonograph includes an inner housing portion 44 with a lower surface 46 which is adapted to rest on a record. A partial circular flange 48 serves as a guide means for centering the housing on a record, the illustrated guide means being of a type useful for typical 45 r.p.m. records which have large center holes, although other types of guides could be used for playing other types of records. The inner housing portion also includes a motor 50 for driving the housing portion on which the tone arm is carried, an amplifier 52 for amplifying signals received from the stylus on the tone arm, a speaker 54 coupled to the amplifier for converting the signals to sound waves that can emanate from the top of the phonograph housing, and a battery case 56 for holding batteries which energize the motor and amplifier. The switch 22 on top of the housing is a combination on-off switch for controlling current to both the motor and amplifier, and a volume control. It can also include a potentiometer for controlling the voltage applied to the motor 50 to enable compensation for varying voltages from the batteries.

The rotatable housing portion 14 is rotatably supported on the inner portion 44 by a pair of support rollers 58, 60 and the shaft 62 of the motor. The rotatable housing portion has a track 64 of rubber or other high friction material. The rollers 58, 60 are rotatably mounted on the inner housing portion 44 and they rollably engage the track 64. The motor shaft 62 includes a sleeve 66 which also contacts the track 64 so as to drive the outer housing portion 14. A pressure roller 68 opposite the sleeve 66 on the motor shaft assures good contact between the motor shaft and the track 64. This manner of support eliminates the need for reduction gear train from the motor, and also assures stable support of the rotatable housing portion 14 on which the tone arm is supported. In order to maintain concentricity of the rotatable housing portion 14 with the housing portion 44 on which it is mounted, three aligning rollers 70 are provided, which are rotatably mounted on the inner housing portion 44 and which have peripheral portions engaged with the inner side of the housing portion 14.

The tone arm 16 has an inner end pivotally coupled to the rotatable housing portion 14 by a shaft 72. The stylus 18 is connected through leads 74 to a pair of brushes 76, 78 which are mounted on the rotatable housing portion. The brushes 76, 78 contact commutator rings 80, 82 on the inner housing portion, which are connected to the amplifier 52, to couple signals from the stylus to the amplifier.

When the phonograph is placed on a record, the tone arm 16 can be pivoted outwardly until an inner portion 84 thereof abuts a stop portion 86 on the rotatable housing portion. The stop 86 is positioned so that it limits outward tone arm pivoting to a position where the stylus at its outer end lies just inside of the perimeter of a record of given size. Accordingly, the tone arm is easily started at the beginning of a spiral record groove for a particular size record, such as a 45 r.p.m. standard size. It is desirable to provide means for easily lifting and lowering the stylus 18 from the level of the record so as to prevent scratching the record as the tone arm is pulled outwardly. A stylus operating member 88 is provided near the outer end of the tone arm, which can be slid outwardly and inwardly to lift and lower the stylus. The member 88 is generally placed in the position 88A when the tone arm is pivoted out, and is then pushed in slightly to the position 88 shown in FIG. 3 to allow the stylus to drop into the record groove. With the stylus lowered onto the beginning of the record groove, the on-off switch 22 can be turned on to play the record.

When the sound portion of the record groove has been completely traversed by the stylus, and it closely approaches the runout groove 24, the tone arm is at a position 16A shown in phantom lines in FIG. 3. At this position, the tone arm deflects a button 90 on a cutoff switch 92 which is fastened to the rotatable housing portion 14. The cutoff switch 92 is connected in series with the batteries in the battery case so that deflection of the button by the tone arm deenergizes the amplifier and the motor. Accordingly, the phonograph is turned off just prior to the stylus entering the runout groove. The cutoff switch 92 also deenergizes the motor and amplifier when the tone arm is pivoted inwardly even further to a position flush with the round housing. The cutoff switch is useful in preventing premature wearing out of the batteries if a child should leave the phonograph on a record and walk away for an extended peroid, and also in case a child extended period, turn on the switch 22 when the phonograph is completely closed up for storage.

The phonograph allows the use of a relatively large speaker 54, the speaker being almost as large in diameter as the phonograph housing. It is found that somewhat better sound is produced when apertures 94 are provided in the lower portion of the inner housing 44 to allow coupling of the rear of the speaker 54 to the outside air. The provision of such apertures for acoustically coupling the rear of the speaker to the outside air is especially important when the acoustical chamber provided by the case 12 is mounted over the front of the speaker at the top of the housing. With the speaker facing upwardly, the acoustical case 12 mounted on top of the phonograph housing, and the presence of apertures 94 in the side of the lower housing portion for coupling to the surrounding air, very good sound is obtained from the phonograph.

Thus, the invention provides a compact phonograph which provides good reproduction. The batteries which power the phonograph have a long life because current to the motor and amplifier is turned off at the end of each record playing and during storage. Battery life is further enhanced because the rotating portion of the phonograph is light in weight, the batteries and speaker being mounted on the stationary inner housing portion 44. Coupling of the stylus pickup to the loudspeaker is made through the commutator apparatus, and through the amplifier which is also mounted on the stationary inner housing portion.

Although particular embodiments of the invention have been described and illustrated herein, it is recognized that modifications and variations may readily occur to those skilled in the art, and consequently, it is intended that the claims be interpreted to cover such modifications and equivalents.

What is claimed is:

1. A phonograph for playing a record with a substantially spiral track in an outer annular area and having an inner circular area comprising:

a fixed housing having a generally circular perimeter of a diameter no greater than that of said circular area and including a first portion having a first diameter and a second portion having a second diameter which is less than said first diameter, said second portion including means adapted to support said housing on said inner circular area and for positioning said fixed housing at the center of said record;

an annular rotatable housing having a generally circular perimeter of approximately the same diameter as said first portion of said fixed housing;

means rotatably mounting said annular rotatable housing on said second portion of said fixed housing;

arcuate tone arm means including pickup means for engaging said record track;

means swingably connecting said tone arm means to said rotatable housing to move radially outwardly from the perimeter thereof and inwardly to a position at least substantially flush with the perimeter thereof; and motor means mounted on said fixed housing and including an output shaft extending into said rotatable housing for rotating said rotatable housing to move said tone arm means around said record.

2. The phonograph described in claim 1 wherein:

said housing includes an inner portion for mounting on said record to remain stationary thereon, said inner portion 1 including:

a loudspeaker mounted in said fixed housing; and means including a commutator for coupling said pickup means to said loudspeaker.

3. The phonograph described in claim 2 including:

a pair of rollers rotatably mounted on said fixed housing at circumferentially spaced positions, said rollers having perimeters rollably engaged with said rotatable housing to support said rotatable housing on said fixed housing, said motor means being also mounted in said fixed housing with said output shaft extending into said rotatable housing at a position circumferentially spaced from said rollers, said output shaft being rollably engaged with said rotatable housing to support and drive it.

4. The phonograph described in claim 1 including:

a switch engageable by said tone arm means for deactivating said motor means when said tone arm means moves from a position radially outwardly of the perimeter of said rotatable housing inwardly to a predetermined position adjacent said substantially flush position.

5. The phonograph described in claim 2 wherein:

said loudspeaker includes a first portion mounted in said first portion of said fixed housing and a second portion extending into said second portion of said fixed housing, said second portion of said fixed housing being provided with openings communicating with said second portion of said loudspeaker, whereby to enhance the bass response thereof.

* * * * *